United States Patent
Wittwer

(10) Patent No.: US 11,508,495 B2
(45) Date of Patent: Nov. 22, 2022

(54) METHOD OF PREPARING EPOXY COATED BUS BARS FOR USE IN ELECTRICAL DISTRIBUTION EQUIPMENT

(71) Applicant: Schneider Electric USA, Inc., Andover, MA (US)

(72) Inventor: John A Wittwer, Cincinnati, OH (US)

(73) Assignee: Schneider Electric USA, Inc., Andover, MA (US)

(*) Notice: Subject to any disclaimer, the term of this patent is extended or adjusted under 35 U.S.C. 154(b) by 0 days.

(21) Appl. No.: 15/842,037

(22) Filed: Dec. 14, 2017

(65) Prior Publication Data

US 2019/0189305 A1 Jun. 20, 2019

(51) Int. Cl.
*H01B 3/44* (2006.01)
*H01R 43/28* (2006.01)
*B05D 1/24* (2006.01)
*B05D 1/32* (2006.01)
*B05D 3/02* (2006.01)
(Continued)

(52) U.S. Cl.
CPC ............... *H01B 3/44* (2013.01); *B05D 1/24* (2013.01); *B05D 1/325* (2013.01); *B05D 3/0218* (2013.01); *B05D 3/0254* (2013.01); *H01B 13/106* (2013.01); *H01R 43/28* (2013.01); *H02G 1/1273* (2013.01); *H02G 1/1275* (2013.01)

(58) Field of Classification Search
CPC .... H01B 3/44; H01B 13/106; H01B 13/0016; H01B 13/06; H01B 13/165; B05D 1/24; B05D 1/325; B05D 3/0218; B05D 3/0254; H01R 43/28; H02G 1/1273; H02G 1/1275

USPC ........................................................... 427/58
See application file for complete search history.

(56) References Cited

U.S. PATENT DOCUMENTS 4,820,178 A * 4/1989 Anderson ............ H01R 25/164
439/114
5,142,950 A 9/1992 Takano et al.
(Continued)

FOREIGN PATENT DOCUMENTS

CN 104813416 A 7/2015
CN 104934139 A 9/2015
(Continued)

OTHER PUBLICATIONS

JP-01281896-A, machine translation, originally publised 1989, p. 1-3 (Year: 1989).*

(Continued)

*Primary Examiner* — Katherine A Bareford
*Assistant Examiner* — Christina D McClure
(74) *Attorney, Agent, or Firm* — Locke Lord LLP

(57) ABSTRACT

An automated process for producing exposed electrical contact areas on the conductor part of an epoxy coated bus bar. When the epoxy coating is in the glassy state, one can safely and economically, preferably via automated apparatus, put the epoxy into the rubbery state by positioning the bar and applying localized heat at a select area of the coating; monitoring the heating to above the glass transition temperature of the epoxy, bringing cutting tools into contact with the epoxy for cutting and removing the rubbery coating away from the bus bar, and cooling the bus bar to bring adjacent coating back to the glassy state, thereby leaving an exposed electrical contact area of conductor on the bus bar with little or no surface damage.

7 Claims, 4 Drawing Sheets

(51) Int. Cl.
H01B 13/10 (2006.01)
H02G 1/12 (2006.01)

(56) References Cited

U.S. PATENT DOCUMENTS

| | | | |
|---|---|---|---|
| 5,179,779 A | 1/1993 | Iura et al. | |
| 5,832,595 A * | 11/1998 | Maruyama | H01L 21/485 29/829 |
| 5,904,984 A * | 5/1999 | Smith | H01B 3/40 252/299.01 |
| 2003/0198537 A1* | 10/2003 | Larsen | B32B 15/08 413/2 |
| 2005/0171802 A1* | 8/2005 | Rochford | B23K 1/018 29/426.5 |
| 2014/0060281 A1* | 3/2014 | Flehmig | B23K 31/00 83/865 |
| 2014/0116617 A1* | 5/2014 | Walgenbach | H02G 5/06 156/295 |
| 2014/0273302 A1* | 9/2014 | Chien | H01L 21/67051 438/14 |
| 2015/0155673 A1 | 6/2015 | Kawamura et al. | |
| 2016/0039192 A1* | 2/2016 | Gleyal | C09J 163/00 156/330 |
| 2017/0163020 A1* | 6/2017 | Taki | H01B 7/0275 |

FOREIGN PATENT DOCUMENTS

| | | | | |
|---|---|---|---|---|
| FR | 2033084 | | 11/1970 | |
| GB | 694619 A | * | 7/1953 | ............... H02B 1/21 |
| JP | 01281896 A | * | 11/1989 | |

OTHER PUBLICATIONS

Epotek, "Reworking, Removing and "Decapsulating" Cured Epoxies", 2015, p. 1 (Year: 2015).*
Extended European Search Report for European Patent Application No. 18200802.9 dated Apr. 26, 2019, 7 pages.
European Examination Report dated Nov. 11, 2020 for European Application No. 18200802.9 (8 pages).
First Chinese Office Action dated Aug. 6, 2021 for corresponding Chinese Patent Application No. 201811281535.5, 8 pages.
Indian Patent Office Action dated Mar. 25, 2022 in corresponding Indian Patent Application No. 201814041607, [6 pages].

* cited by examiner

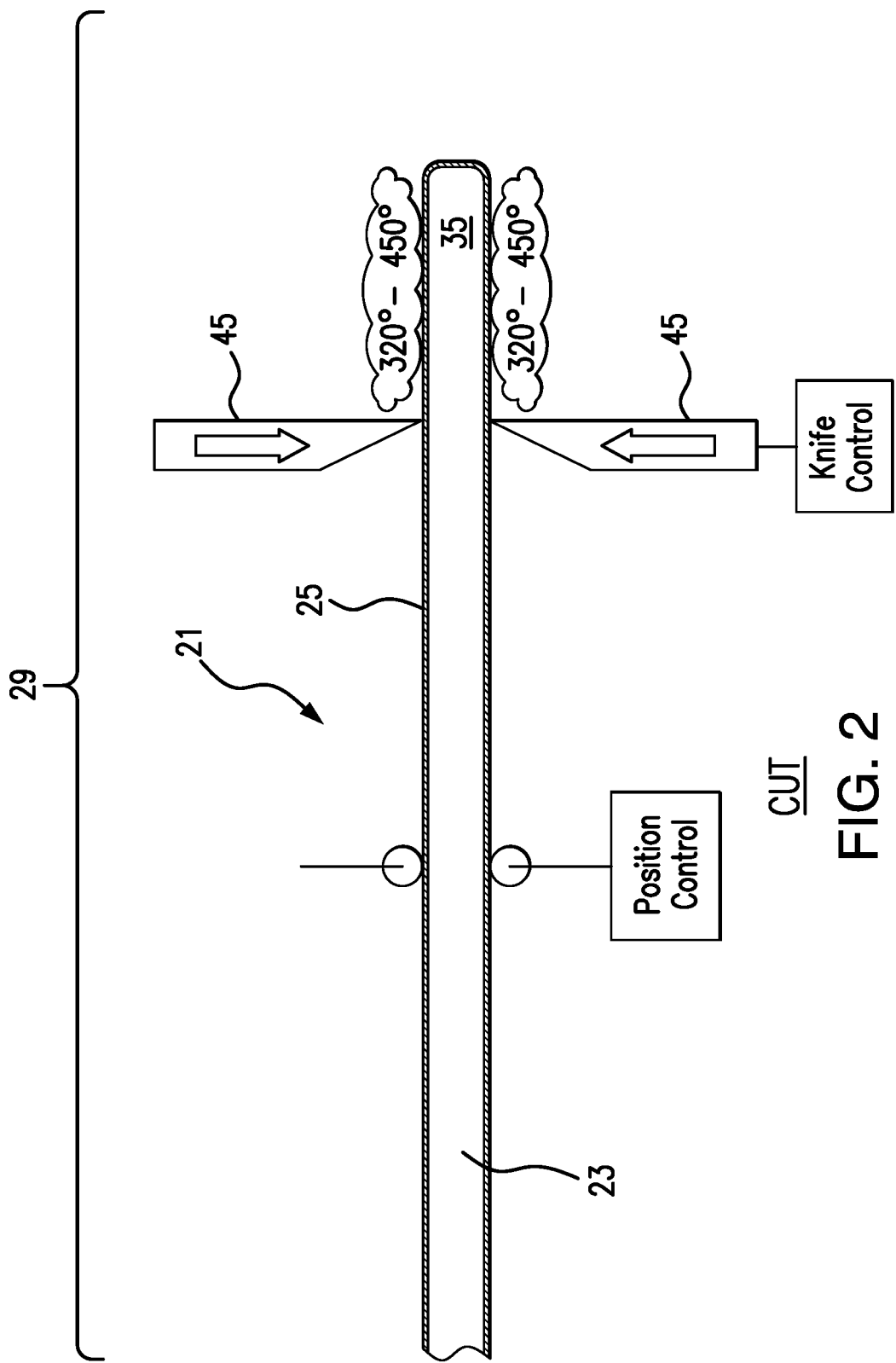

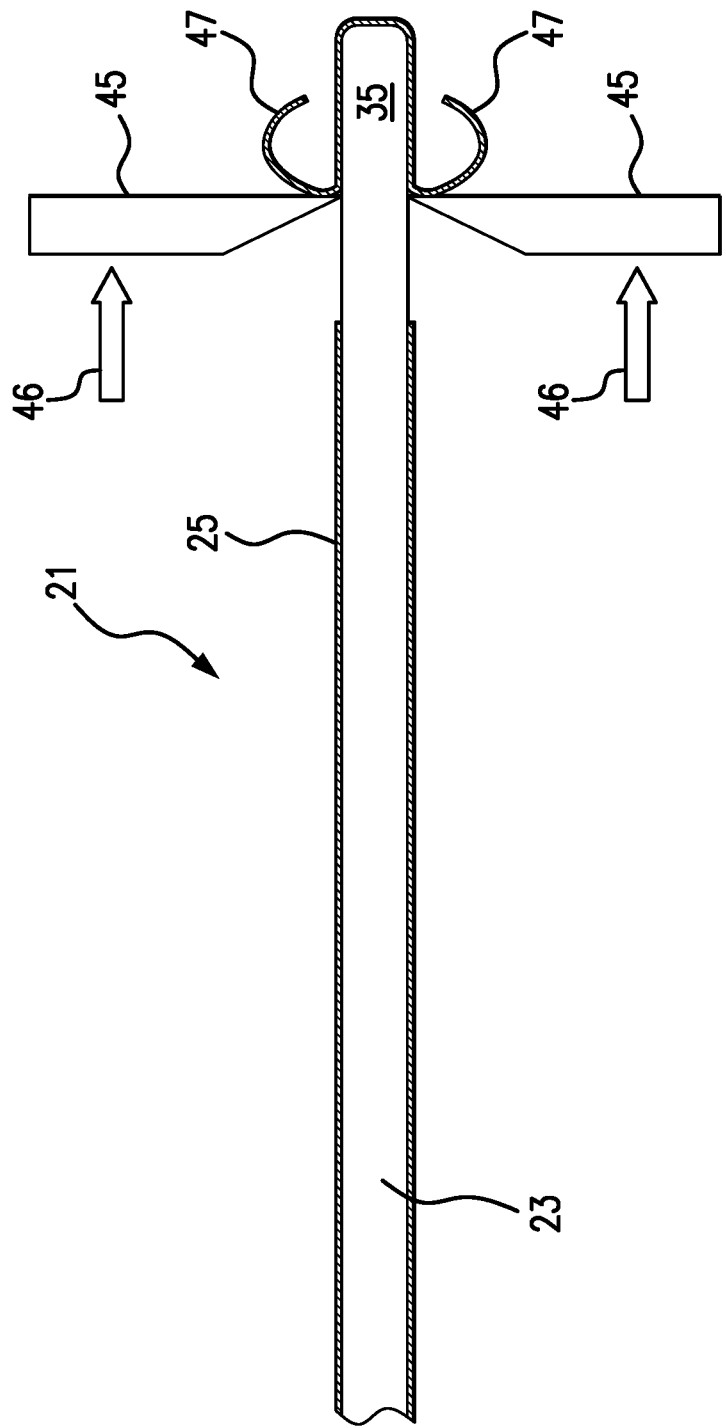

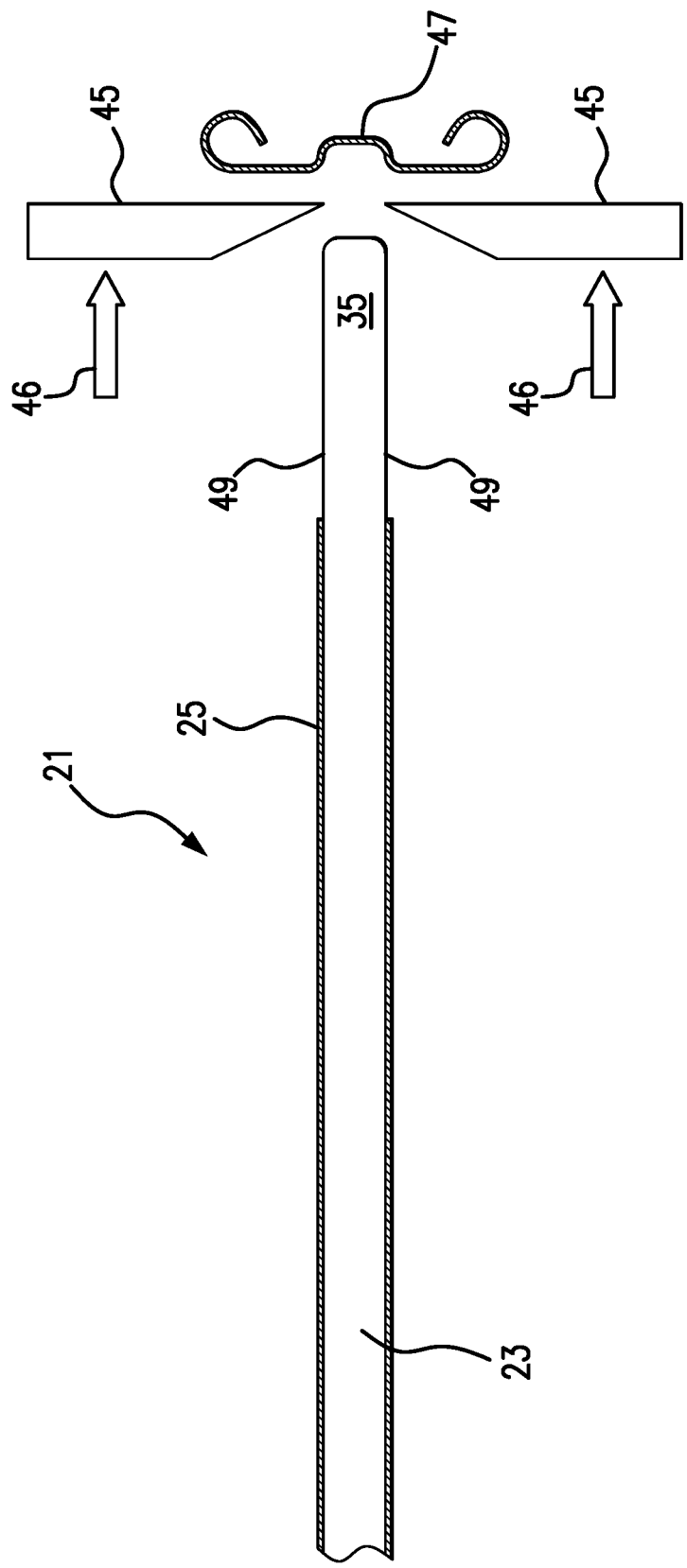

METHOD OF PREPARING EPOXY COATED BUS BARS FOR USE IN ELECTRICAL DISTRIBUTION EQUIPMENT

BACKGROUND OF THE INVENTION

Field of the Invention

The present invention relates generally to electrical distribution equipment using epoxy coated bus bars and specifically relates to a method of preparing clean areas of conductor for the bus bar after they have been epoxy coated.

Discussion of the Related Art

Electrical Distribution Equipment of certain capacities, e.g. such as busway type product, will often use prefabricated bus bars of solid conductor material. Often those bus bars will be coated in epoxy to provide insulation. However, as the bus bars must be joined to each other and to other distribution apparatus, non-insulated epoxy free areas of the bus bars must be made available to accomplish these conductive joints. For instance, in the case of busway bus bars the ends of the bars are shaped to be separated and connected by joint packs. Likewise, shaping bends may occur in the middle of bars in order to allow plug in units, such as power take-off points, to be added onto the bus bars along their lengths.

In the past, methods used or suggested have included taping the bare bus bars to mask desired conductive areas and prevent epoxy adherence before application of the insulative coating. However this masking and demasking approach is labor intensive and may require costly specialized tapes.

It is also known in the art that, to reclaim a bus bar that has been defectively coated, one may heat the entire bar and strip away all epoxy coating. Some manufacturers heat entire small bus bars in convection ovens and then manually strip all the epoxy off the bars for rework when there's a defect. However, this is only done for rework and has obvious limitations, such as oven and bus bar size, energy usage, safety, and time; in regard to throughput for routine manufacturing.

SUMMARY OF THE PRESENT INVENTION

The present invention proposes to provide a more effective and cost efficient method of providing clean conductor areas on previously coated epoxy coated bus bars which is also less destructive to the conductor surfaces. It has been found that, taking an epoxy coated bus bar where the epoxy is in the glassy state, one can safely and economically, preferably via automated apparatus, put the epoxy into its rubbery state by positioning the bar and applying localized heat at a select area of the coating; monitoring the heating to above the glass transition temperature of the epoxy, bringing cutting tools into contact with a subject area of the epoxy for cutting and removing the rubbery coating away from the bus bar, and cooling the bus bar to bring adjacent coating back to the glassy state, thereby leaving an exposed electrical contact area of conductor on the bus bar with little or no surface damage, much in the manner of removing an insulator coating from a strand of wire, thus eliminating the need to mask the contact surface areas before epoxy coating then removing the masking material after the epoxy process.

The present invention presents a method of preparing epoxy coated bus bars for use in electrical distribution equipment comprising the steps of: a) coating a bus bar conductor with epoxy and letting the epoxy harden to a glassy state on the bar; b) applying a localized heating to the subject area of hardened epoxy until the subject area of hardened epoxy is at or above its glass transition temperature and the subject area of epoxy is in a rubbery state and delaminates from the bus bar conductor; c) cutting the subject area of rubbery epoxy from the layer of epoxy remaining on the bus bar and removing the rubbery epoxy of the subject area from the bus bar to create an electrical contact area; and d) allowing the epoxy coated bus bar with the electrical contact area to cool below the glass transition temperature to reharden any epoxy coating at the boundary of the electrical contact area.

In other aspects the method of preparing epoxy coated bus bars for use in electrical distribution equipment per above may further comprise the steps of: monitoring the temperature of the subject area while the localized heating is applied. In other aspects the heating, cutting, and removing steps may be accomplished by automated apparatus. In other aspects the subject area may be at a bus bar end. In other aspects the application of heat may be done through one of induction or infrared heaters.

The present invention may further present a method of creating electrical contact areas on an epoxy coated bus bar wherein the epoxy is in the glassy state, the method comprising putting the epoxy into the rubbery state via automated means positioning the bar and applying localized heat at a select area of the epoxy coating; monitoring the heating to above the glass transition temperature of the epoxy, bringing cutting tools into contact with the epoxy while above the glass transition temperature for cutting and removing the epoxy away from the bus bar to create an electrical contact area, and cooling the epoxy coated bus bar to bring coating adjacent to the contact area back to a glassy state, thereby leaving an exposed electrical contact area of conductor on the bus bar.

BRIEF DESCRIPTION OF THE DRAWINGS

The foregoing and other advantages of the disclosed embodiments will become apparent upon reading the following detailed description and upon reference to the drawings, wherein:

FIG. 2 is a schematic showing an application of cutting tools to the subject area of epoxy while it is above its glass transition temperature.

FIG. 3 is a schematic showing movement of the cutting tools to move the subject area of epoxy layer from the contact area while it is above its glass transition temperature.

FIG. 4 is a schematic showing movement of the cutting tools to remove the subject area of epoxy from the epoxy coated bus bar while it is above its glass transition temperature.

DETAILED DESCRIPTION

Figure 1:
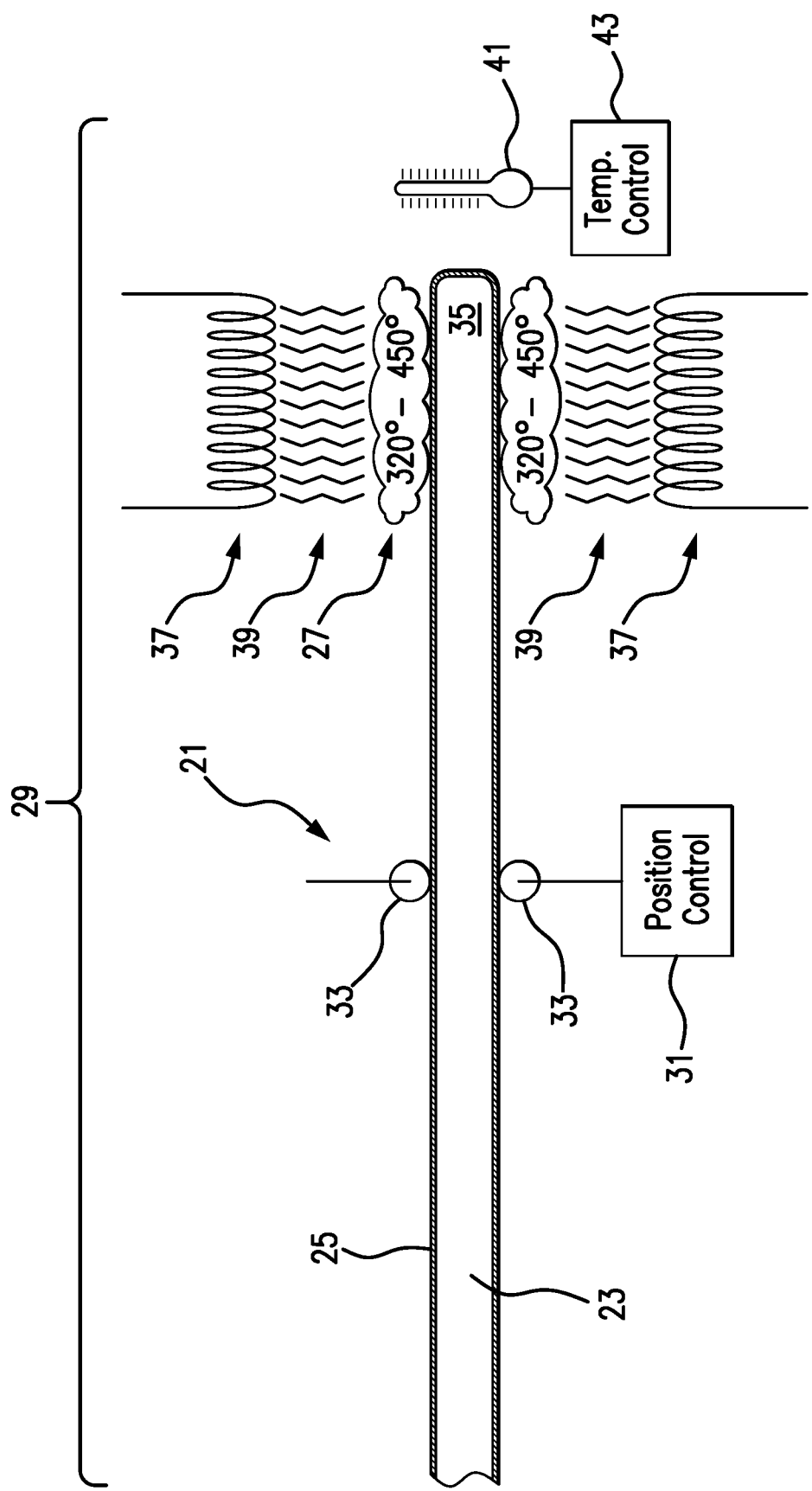
FIG. 1 is a schematic illustration of an epoxy coated bus bar in an automated apparatus for creating electrical contact areas on the bar, with a first step of localized heating of the epoxy layer.

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Further, words of degree, such as "about," "substantially," and the like may be used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

FIG. 1 shows a typical epoxy coated bus bar 21 for use in electrical distribution equipment. The conductor portion 23 of the bar has been coated on all sides with a layer of epoxy 25. As is known, hardened epoxy is a crystalline solid which can exist in two states, namely a glassy state, sometimes called "cured" or "hardened," when below its glass transition temperature and a rubbery state when above its glass transition temperature. The glass transition temperature can more accurately be thought of as a temperature range at which the rubbery state exists and will be dependent upon the formulation of the epoxy. Illustrated here is a typical range for an insulative coating epoxy of 320-450° F. at 27. The bar 21 is preferably placed in a separate dedicated area or apparatus 29 for removing selected areas of epoxy coating 25 from the conductor bar 23 thereby creating electrical contact areas on the bus bar. Automation of the processes herein is preferable for safety reasons and should be easily accomplished with the application of ordinary skill in the art. The automated apparatus 29 will provide maximum safety for the operator and may include a positioning control 31 which could include rollers 33 or the like to move or hold the bar 21 throughout the processes described herein. As illustrated in FIG. 1, the end 35 of the bar 21, which needs to be electrically connected to other conductors when constructed into electrical distribution apparatus, is the selected subject area which has been positioned within a heating apparatus 37 represented by induction coils on both sides of the bar 21. Heat 39 is applied, and is monitored by temperature sensor 41 and controlled by temperature controller 43. The temperature sensor 41 could be a surface probe or air temperature probe, by themselves or in conjunction with an empirically derived fixed time of heat application to be used for all similar compositions and constructions of conductor and epoxy. The construction and use of all apparatus herein is assumed to be within the ordinary skill in the art. An induction heater has been found to bring the epoxy 25 to its glass transition range within two to ten seconds. Burning of the epoxy and/or marring of the underlying conductor surfaces is to be avoided.

FIG. 2 shows the initial cutting step, after heating, whereby the bar 21, at glass transition temperatures resulting in a rubbery state of the epoxy in the selected area, has been moved to a cutting area where cutting tools such as blades 45 on each side of the bar 21 can be moved to cut the rubbery epoxy of the select area. It will be appreciated that the bar 21, the blades 45, or both could be moved into the appropriate positions to accomplish this step. Likewise, the blades might take any number of forms including for example straight edges or roller blades, tensioned wires, or shaped cutting forms with edges in more than one axis if necessary.

FIG. 3 shows the subsequent stripping step whereby the blades, with minimum clearance to the conductor 23 are drawn, as indicated by arrows 46, toward the end 35 of the bar 21, thereby peeling the rubbery epoxy 47, which has become delaminated, away from the conductor 23. Care should be taken to not gouge the surfaces of the conductor 23 during this operation.

FIG. 4 shows the mechanical disassociation step where the subject area of rubbery epoxy 47 is pulled free of the conductor 23 and the remaining layer of epoxy 25 by continued motion 46 of the blades 45 thereby creating a bare electrical contact surface area suitable for connection to other conductors. Timing of the cutting, stripping, and disassociation steps, as well as heat retention by the epoxy coated bus bar 21, should be considered to effect removal of the subject area of rubbery epoxy while in the rubbery state. It will be appreciated that the blades 46 could remain stationary and the epoxy coated bus bar 21 moved in relation to the blades. It is further contemplated that a mechanism apart from the cutting blades could be utilized to accomplish the disassociation of the rubbery epoxy 47 from the epoxy coated bus bar 21. Once the electrical contact area 49 has been created, the bus bar with remaining epoxy coating is allowed to cool below glass transition temperature; whereby any remaining epoxy at the boundary area of the select area can return to the glassy state and the bus bar with the electrical contact area can be removed from the automated epoxy delamination procedure and/or apparatus 29.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A method of preparing epoxy coated bus bars for use in electrical distribution equipment comprising:

coating an uninsulated surface of a bus bar conductor with a coating of insulating epoxy that is a crystalline solid which can exist in two states, a glassy state when below its glass transition temperature and a rubbery state when above its glass transition temperature, and letting the coating of insulating epoxy harden to the glassy state on the surface of the bus bar conductor;

applying a localized induction heating to the bus bar conductor in a subject area of the hardened coating of insulating epoxy until a temperature of the coating of the hardened insulating epoxy on the surface of the bus bar conductor in the subject area is at or above its glass transition temperature and the subject area of the coating of insulating epoxy is in the rubbery state, to avoid burning the epoxy;

delaminating the coating of insulating epoxy in the rubbery state from the surface of the bus bar conductor in the subject area;

cutting the subject area of the coating of rubbery insulating epoxy from the layer of epoxy remaining on the bus bar by bringing cutting tools into contact with the coating of rubbery insulating epoxy while at or above its glass transition temperature;

mechanically disassociating the subject area of the coating of rubbery insulating epoxy from the surface of the bus bar conductor by drawing the cutting tools along a length of the bus bar conductor in the subject area to pull the coating of rubbery insulating epoxy free of the bus bar conductor and from the remaining layer of epoxy adjacent to the subject area and removing the coating of rubbery insulating epoxy of the subject area from the bus bar conductor based on heat retention by the bus bar from the induction heating, to create an exposed electrical contact area; and allowing the epoxy coated bus bar with the electrical contact area to cool below the glass transition temperature to reharden any epoxy coating at a boundary of the electrical contact area.

2. The method of preparing epoxy coated bus bars for use in electrical distribution equipment of claim 1, further comprising: monitoring the temperature of the subject area while the localized heating is applied.

3. The method of preparing epoxy coated bus bars for use in electrical distribution equipment of claim 1, wherein the heating, cutting, and removing are accomplished by automated apparatus.

4. The method of preparing epoxy coated bus bars for use in electrical distribution equipment according to claim 1 wherein the subject area is a bus bar end, and the rubbery epoxy is removed from all sides of the bus bar end.

5. The method of preparing epoxy coated bus bars for use in electrical distribution equipment according to claim 1 wherein the application of heat is done through induction heaters.

6. A method of creating electrical contact areas on a bus bar coated with hardened insulating epoxy wherein the epoxy is in a glassy state, comprising:

wherein the insulating epoxy is a crystalline solid which can exist in two states, the glassy state when below its glass transition temperature and a rubbery state when above its glass transition temperature;

putting the coating of hardened insulating epoxy into the rubbery state via automated means positioning the bus bar, by applying a localized induction heating to the bus bar conductor at a select area of the insulating epoxy coating until a temperature of the coating of the hardened insulating epoxy in the select area on the surface of the bus bar conductor is at or above its glass transition temperature, to avoid burning the coating of insulating epoxy;

monitoring the heating to above the glass transition temperature of the coating of insulating epoxy;

delaminating the coating of insulating epoxy in the rubbery state from the surface of the bus bar conductor in the select area;

bringing cutting tools into contact with the insulating epoxy while above the glass transition temperature for cutting the select area of the insulating epoxy away from the bus bar;

mechanically disassociating the select area of rubbery state insulating epoxy from the surface of the bus bar conductor by drawing the cutting tools along a length of the bus bar conductor in the select area to pull the coating of rubbery insulating epoxy free of the bus bar conductor and from a remaining layer of epoxy adjacent to the select area and removing the coating of the rubbery insulating epoxy of the select area away from the bus bar conductor based on heat retention by the bus bar from the induction heating, to create an exposed electrical contact area, and;

cooling the epoxy coated bus bar to bring coating adjacent to the contact area back to a glassy state, thereby leaving an exposed electrical contact area of conductor on the bus bar.

7. A method of preparing epoxy coated bus bars for use in electrical distribution equipment comprising:

coating surfaces of first and second sides of an uninsulated bus bar conductor with a coating of insulating epoxy that is a crystalline solid which can exist in two states, a glassy state when below its glass transition temperature and a rubbery state when above its glass transition temperature, and letting the coating of insulating epoxy harden to the a glassy state on the surfaces of first and second sides of the bus bar conductor;

applying a localized induction heating to the first and second sides of the bus bar conductor in a subject area of the hardened coating of insulating epoxy until a temperature of the subject area of the coating of hardened insulating epoxy on the surface of the bus bar conductor is at or above its glass transition temperature and the subject area of the coating of insulating epoxy is in the a rubbery state to avoid burning the epoxy;

delaminating the coating of insulating epoxy in the rubbery state from the surfaces of first and second sides of the bus bar conductor in the subject area;

cutting the subject area of the coating of rubbery insulating epoxy from the layer of epoxy remaining on the first and second sides of the bus bar by bringing cutting tools located on the first and second sides of the bus bar, into contact at substantially the same time with the coating of rubbery insulating epoxy while at or above its glass transition temperature;

mechanically disassociating the subject area of the coating of rubbery insulating epoxy from the surfaces of first and second sides of the bus bar conductor by drawing the cutting tools along a length of the bus bar conductor in the subject area to pull the coating of rubbery insulating epoxy free of the surfaces of first and second sides of the bus bar conductor and from a remaining layer of epoxy adjacent to the subject area and removing the coating of rubbery insulating epoxy of the subject area from the first and second sides of the bus bar conductor based on heat retention by the bus bar from the induction heating, to create an exposed electrical contact area; and allowing the epoxy coated bus bar with the electrical contact area to cool below the glass transition temperature to reharden any epoxy coating at the boundary of the electrical contact area.

\* \* \* \* \*